Figure 1:
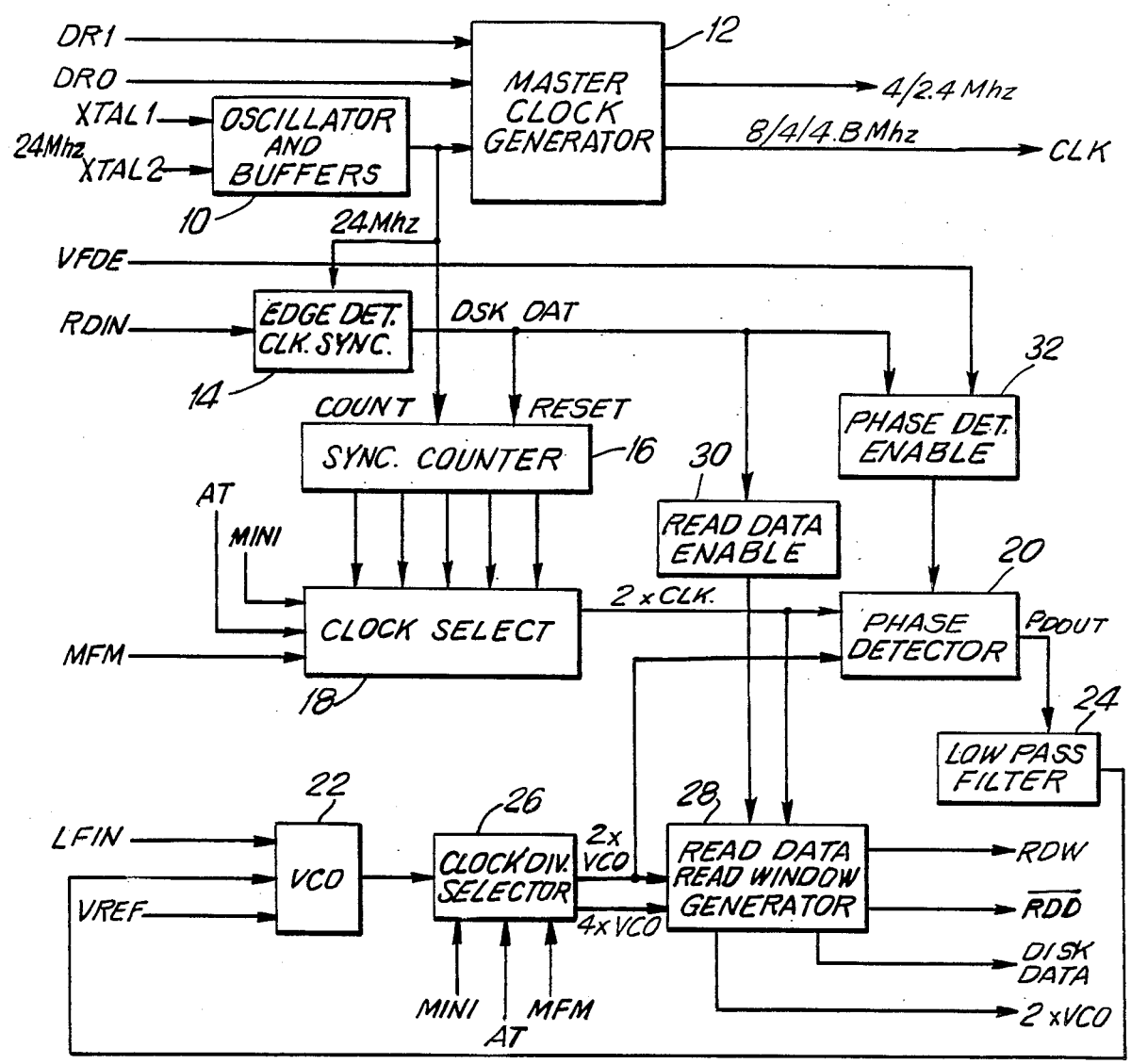

United States Patent [19]

Wahler

[11] Patent Number: 4,845,575
[45] Date of Patent: Jul. 4, 1989

[54] ANALOG FLOPPY DISK DATA SEPARATOR

[75] Inventor: Richard E. Wahler, Levittown, N.Y.

[73] Assignee: Standard Microsystems Corporation, Hauppauge, N.Y.

[21] Appl. No.: 106,552

[22] Filed: Oct. 6, 1987

[51] Int. Cl.$^4$ .............................................. G11B 5/09
[52] U.S. Cl. ....................................................... 360/51
[58] Field of Search .......................... 360/51; 369/59; 375/118–120, 168; 331/1 A

[56] References Cited

U.S. PATENT DOCUMENTS 4,734,900 5/1988 Davie ...................................... 360/51
4,737,866 4/1988 Ebata ...................................... 360/51

Primary Examiner—Vincent P. Canney
Attorney, Agent, or Firm—Hopgood, Calimafde, Kalil, Blaustein & Judlowe

[57] ABSTRACT

A floppy disk data separator includes a phase lock loop which locks onto a clock signal that is synchronized to the data stream being read from the disk. The clock signal is derived from a sync counter which is reset each time a data bit is received from the disk. The output of the sync counter is an edge delayed by $\frac{1}{4}$ of a bit time. The next edge of the clock occurs each $\frac{1}{2}$ bit time after that until the next data bit is received. These clock signals are phase compared with clock signals produced in the phase lock loop to synchronize the clock to the disk data. In another aspect of the invention, the phase lock loop is operated in either a low-gain or high-gain mode.

2 Claims, 3 Drawing Sheets

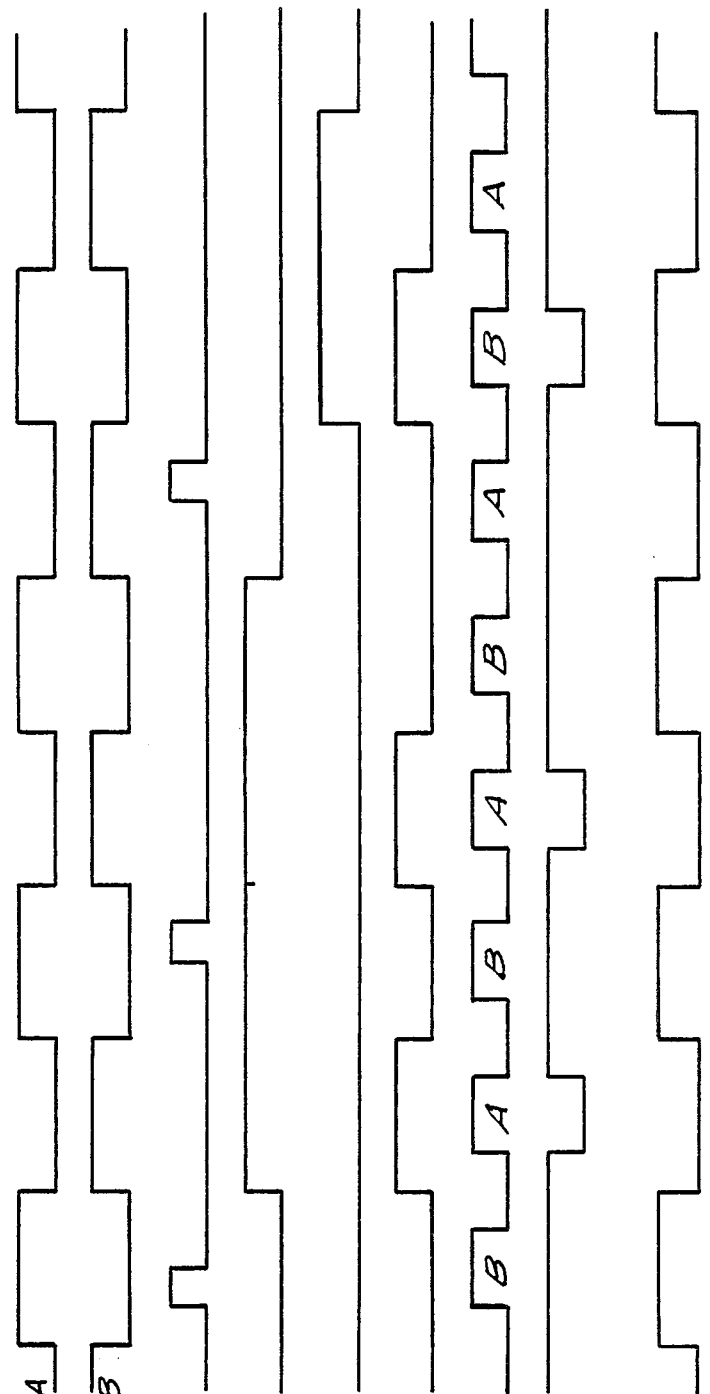
FIG.3(a) 4xVCO
FIG.3(b) 2xVCO
FIG.3(c) WINDOW A
FIG.3(d) WINDOW B
FIG.3(e) DELAYED DATA
FIG.3(f) DATA A
FIG.3(g) DATA B
FIG.3(h) NRZ DAT
FIG.3(i) PULSE WINDOW
FIG.3(j) $\overline{RDD}$
FIG.3(k) RDW = WINDOW A

ANALOG FLOPPY DISK DATA SEPARATOR

The present invention relates generally to data communication, and more particularly to an improved data separator for use with a floppy disk.

One of the most commonly used sources of data for use in microprocessors and other forms of digital data processors is a floppy disk. Data is typically stored on a floppy disk in one of several known formats, such as the commonly employed self-clocking Manchester codes that include MFM, FM, MMFM and others. The information stored on a floppy disk in one of these formats includes both data and clock signals combined in an encoded data stream. In order for the information stored on the disk to be usable in the external data processor, a data separator is provided to derive separate, reconstructed data and clock signals from the data stream on the disk.

Because of the noise and jitter that may occur in the data stream from the disk, and possible variations in the rotational speed of the floppy disk, the data separator must also be able to maintain synchronization between the reconstructed clock and the input data and to make necessary adjustments in the clock for variations in the frequency or period of the input data derived from the disk. One widely used technique for separating data and developing a reference clock from the encoded data stream involves the use of analog phase lock loop.

In a typical floppy disk format, a track on the disk includes a header portion that comprises sync fields and address data followed by a data portion which also includes sync and associated bits. A gap is provided between the header and data portions of the track. Once the header portion is formatted on the disk it is not thereafter altered or rewritten. However, data in the data portion is commonly changed in that new data is written on the disk to replace old, previously written data. The transition period between the header (address) and data portions are referred to as write splices.

Since the data is written in the data portion at different times than the header information, it may be written onto the disk at a slightly different speed (instantaneous data rate). Therefore, the phase lock loop in the data separator must be able to synchronize itself to at least two different instantaneous data rates in order to read and synchronize information from the disk correctly. That is, the data separator must first synchronize to the address or header data speed in order to read the address information and then resynchronize to the data speed in order to read the data information. The areas where the phase lock loop is to lock to the proper speed are the sync fields.

In prior data separators used in conjunction with floppy disks, during the write splices the phase lock loop locks onto a clock frequency that runs at a nominal clock rate generated from a crystal or other form of stable clock. This clock runs asynchronously to the information from the disk. When it was sensed that the data being read from the disk was a sync field, the phase lock loop would be switched to lock onto the sync data.

This prior design suffered from essentially two drawbacks. First, it required the use of additional circuitry to detect the presence of a sync field, and, second, the lock time of the phase lock loop was increased (by up to two byte times) while this sync detect circuit tried to decide if the information being read from the disk was a sync field or not.

It is accordingly an object of the present invention to provide a floppy disk data separator in which no separate sync detect circuitry is required.

It is a general object of the present invention to provide a floppy disk data separator of the type described which requires less circuitry than prior analogue data separators and which substantially eliminates errors during the gap between address and data portions of a floppy disk track.

To these ends the floppy disk data separator of the present invention includes a phase lock loop (PLL) which locks onto a clock signal that is synchronized to the data stream being read from the disk. The clock signal is derived from a sync counter which is reset each time a data bit is received from the disk. The output of the sync counter is an edge delayed by $\frac{1}{4}$ of a bit time. The next edge occurs each $\frac{1}{2}$ bit time after that until the next data bit is received. These clock signals are phase compared with clock signals produced in the phase lock loop to synchronize the PLL clock to the input disc data. In another aspect of the invention, the phase lock loop operates in either a low-gain or high-gain mode.

Figure 2:
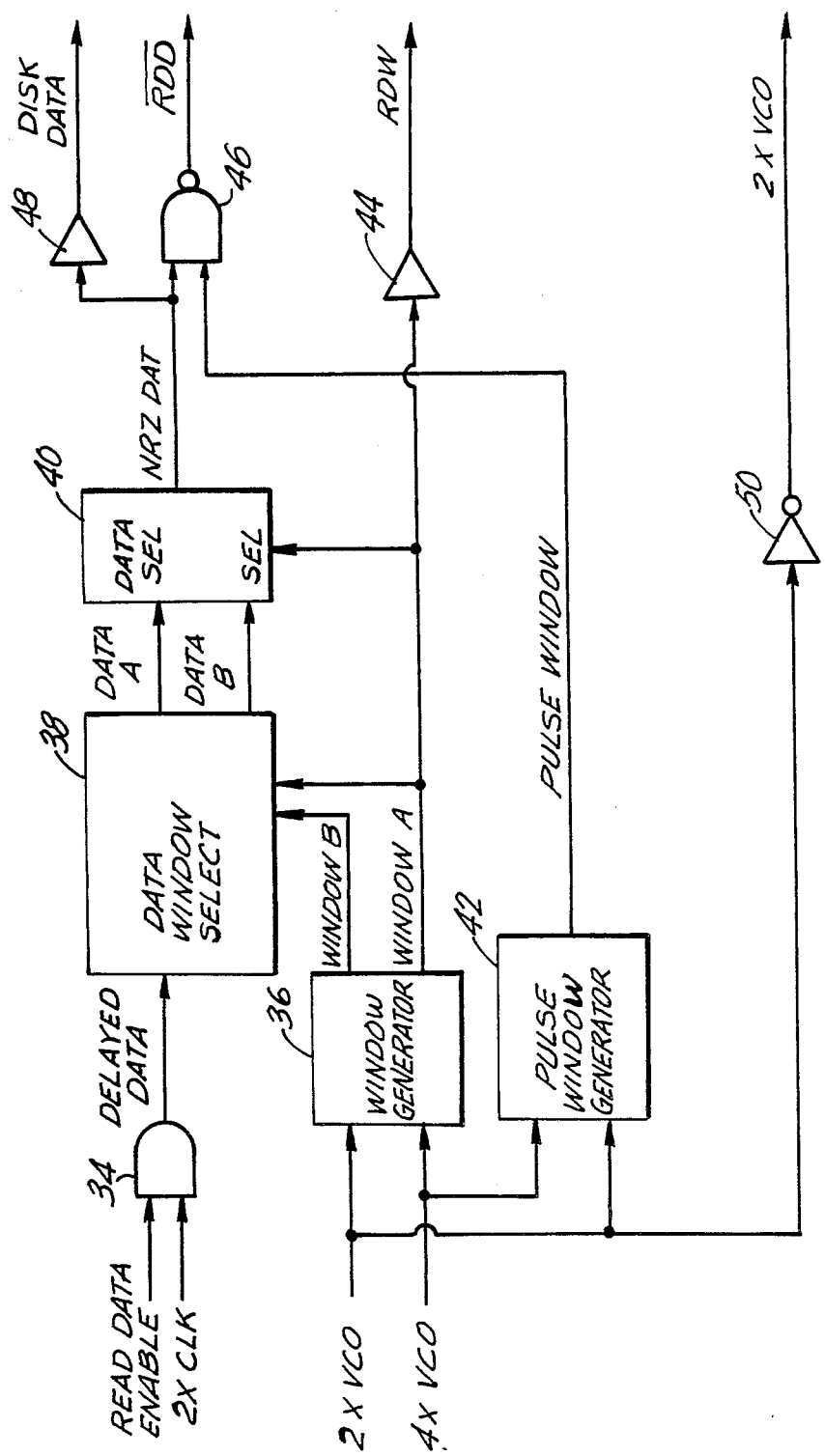

To the accomplishment of these and such further objects as may hereinafter appear, the present invention relates to a floppy disk data separator substantially as defined in the appended claims and as described in the following specification considered together with the accompanying drawings in which:

FIG. 1 is a schematic block diagram of a floppy disk data separator in accordance with an embodiment of the invention; and FIG. 2 is a schematic block diagram of the read data/read window generator of the data separator of FIG. 1; and FIG. 3(a)–(k) are waveforms of signals for use in understanding the operation of the read data/read window generator of FIG. 2.

The embodiment of the data separator of the invention illustrated in FIG. 1 includes an oscillator and buffers 10 which is connected at its XTAL1 and XTAL2 inputs to a buffer (not shown). The oscillator may, as here shown, produce oscillation at a frequency of 24 Mhz. One output of oscillator 10 is applied to an input of a master clock generator 12, which also receives rate control signals DRO and DR1 at its other inputs. Clock generator 12 includes a number of per se conventional frequency dividers, which, under the control of the input rate control signals, produces a master clock signal output CLK at a frequency of either 8, 4.8, or 4 Mhz.

The undivided frequency output of clock generator 10 is applied to one input of an edge detector and clock sync circuit 14, which receives at its other input the data stream RDIN from the floppy disk. In a known manner, edge detect circuit 14 synchronizes the data from the floppy disk with the 24 Mhz clock generated in oscillator 10 and produces a synchronized data signal DSK DAT at its output.

In accordance with the invention, the DSK DAT signal is applied to the reset terminal of a synchronous counter 16, which also receives the 24 Mhz clock at its count input. Counter 16 counts the clock pulse and is reset each time a synchronized data bit is received at its reset terminal from edge detect circuit 14. The outputs of counter 16 are clock signals at different rates, each of which corresponds to twice one of the data rates commonly employed in the conventional floppy disk formats, such as FM or MFM, and 5¼ or 8-inch disk. In the embodiment of the invention herein described, the outputs of counter 16 are at 250 Khz, 300 Khz, 500 Khz, 600 Khz and 1 Mhz.

Each of the outputs of counter 16 is an edge delayed from the data by $\frac{1}{4}$ of a bit time followed by another edge generated each $\frac{1}{2}$ bit time thereafter until the next data bit is received to reset the counter. That is, synchronous counter 16 is cleared by a reset which is generated by the received data bit. The reset also stops any comparison in the phase lock loop that may be in progress at that time. After the reset goes away, the counter 16 is allowed to count. The clock select 18 selects the sync counter output which has an edge that transitions $\frac{1}{4}$ of a bit cell later. Since the counter 16 will run until it is reset, edge transitions will continue to occur each $\frac{1}{2}$ bit cell time until the next data bit is received and the counter 16 is reset.

The delayed count signals generated in sync counter 16 are applied to a clock select circuit 18 which, in accordance with the logic states of three control signals, AT, MINI and MFM, which represent the data code on the drive and thus the desired data rate, selects one of those delayed clock signals and applies that signal 2xCLK (a clock signal a twice the data rate) to one input of a per se conventional phase detector 20. It is this delayed clock signal that is used in the phase lock loop of the data separator of the invention to synchronize the phase lock loop, of which phase detector 20 is a component, to the disk data obtained from the floppy disk.

The phase lock loop further includes a voltage-controlled oscillator (VCO) 22, which receives a reference voltage VREF to establish its nominal frequency, which may conveniently be 2 Mhz. The output of phase detector 20 is applied to an input of a low-pass filter 24, the output of which is applied to the frequency control input of VCO 22. The output of oscillator 22 is applied to a clock divide select circuit 26, which divides the output frequency of oscillator 22 by a factor that is determined by the same input rate control signals MINI, AT, and MFM that are applied to clock select circuit 18.

The output of select circuit 26 is 2xVCO, or twice the nominal data rate, and is applied as the other input of phase detector 20, which, in a known manner, compares the phase of the delayed clock and reference clock and produces an error voltage that is based on this phase difference. That error is smoothed in filter 24 and applied to vary the frequency of oscillator 22 to modify the output frequency of the oscillator and thereby to reduce the phase difference between the clock signals applied to phase detector 20 to lock the phase lock loop to the disk data, as desired.

The clock divide select circuit 26 also produces a signal 4xVCO, which is four times the nominal data rate, and this signal along with the 2xVCO signal are applied as inputs of a read data/read window generator 28, which, in a manner described below with reference to FIGS. 2 and 3, places the received data into the correct half bit cell and generates the Read Data Window (RDW) and Read Data Signals (RDD). The read data/read window generator 28 also receives a read data enable signal produced by a read data enable circuit 30 each time a data bit is received from the disk.

In another aspect of the invention, the phase lock loop operates at a relatively high gain during the sync field portion and at a relatively low gain during the data, header and address portions. To this end, a signal VFOE is applied to a phase detect enable circuit 32 when high-gain loop operation is desired during the sync field of the disk data stream. Enable circuit 32 also receives the synchronized data signal DSK DAT. When either the DSK DAT or VFOE signal is present at its input, detect enable circuit 32 generates an enable signal for the phase detector 20. In the low-gain mode, each data bit received from the disk drive resets the phase detect circuit 20 and counter 16. The phase detect circuit 20 is only enabled for one compare cycle after each data bit. The counter 16 is set such that $\frac{1}{4}$ bit cell after the phase detect reset has gone away it creates an edge and then each $\frac{1}{2}$ bit cell after that it creates another edge until the counter is reset by another data bit. However, only one phase comparison is performed until the next data bit is received. This edge is compared against the edges of the 2xVCO signal by phase detector 20. The relationship between these edges is used to generate one pump-up or pump-down signal for the VCO 22. Therefore, in this mode, each data bit causes only one update to the phase lock loop.

In the high-gain mode, each data bit received from the drive resets phase detector 20 as well as the sync counter 16. The phase detector 20 is, however, in this mode always enabled because of the presence of the VFOE gain control signal at phase detect enable circuit 32. The counter 16 is again set such that $\frac{1}{4}$ bit cell after the phase detect reset has gone away, it creates an edge and then each $\frac{1}{2}$ bit cell after that it also creates an edge until it is reset by another data bit. This edge is compared against the edges of the 2xVCO signal by the phase detector 20. The relationship between these edges is again used to generate the pump-up/pump-down signals from VCO 22. In MFM codes, the minimum spacing between code bits is one bit cell, and the maximum spacing is two bit cells. Therefore, in this mode, each data bit can cause up to four updates to the phase lock loop, thereby to increase the gain of the loop.

As shown in FIG. 2 the read data/read window generator 28 includes an AND gate 34, which gates the Read Data Enable signal and the 2xCLK signal to generate a Delayed Data Signal (FIG. 3e), which has one pulse for each data pulse received by the data separator. By using the 2xCLK signal in this manner, the data is effectively delayed by $\frac{1}{4}$ bit cell.

The 4xVCO (FIG. 3a) and 2xVCO (FIG. 3b) signals are applied to the inputs of a window generator 36, which generates two complementary signals, Window A (FIG. 3c) and Window B (FIG. 3d), which together define the half bit times of the data cell. Window generator 36 divides the 2xVCO signal by two to produce a 1xVCO signal, which is used in the window generator to divide the bit times into these two half bit cells. In MFM data, each encoded data bit has a pulse either in the clock portion or data portion of the data cell.

The Delay Data Signal and Windows A and B are applied to a data window select circuit 38, which determines into which half-bit window a data bit will be placed. By the operation of conventional logic circuitry contained in window select circuit 38 (not otherwise described), when Window A is active (high) any data that is applied to data window select circuit 38 will be considered to be in Window A. Similarly, when Window B is active (high) any data that is the applied to data window select circuit 38 will be considered to be in Window B.

The output signals produced by data window select circuit 38 are Data A (FIG. 3f) and Data B (FIG. 3g).

The Data A signal indicates whether a data bit was received during the previous time that Window A was active. That is, as seen is FIG. 3, if data was received during the previous Window A active time, the Data A signal will be active (high) from the end of this Window A time until the end of the next Window A time. Similarly, if data was received during the previous Window A active time, the Data B signal will be active from the end of that Window B time until the end of the next Window B time.

The Data A and Data B signals along with the Window A signal are applied to a data select circuit 40, which selects which one of the Data A or Data B signals is to be sampled and produces as an output, the non-return to zero (NRZDAT) signal (FIG. 3h). The data select circuit 40 samples the Data A signal when Window A is inactive, and the Data B signal when Window A is active (when Window B is inactive).

The 2xVCO and 4xVCO signals are also applied to the inputs of a pulse window generator 42, which generates a pulse window (FIG. 3i) centered on the output Read Data Window (RDW) (FIG. 3k), which is the Window A signal amplified in an amplifier 44. The Pulse Window is applied to one input of a NAND gate 46, the other input of which receives the NRDZDAT signal. The Pulse Window signal samples the NRZDAT signal from the data select circuit 40 to generate the inverse Read Data signal RDD (FIG. 3j). In this manner, the Pulse Window signal establishes the relative positions of the RDD and RDW output signals to be acceptable to the disk controller to which these signals are applied.

The other outputs of read data/read window generator 28 are the Disk Data signal, which is the NRZDAT signal amplified by an amplifier 48, and the 2XVCO nominal data rate as amplified and inverted in inverter amplifier 50.

It will thus be appreciated from the foregoing description of one embodiment thereof that the data separator of the invention provides increased accuracy of operation for a variety of codes. It will also be appreciated that modifications may be made to the embodiment of the invention hereinabove described without necessarily departing from the spirit and scope of the invention.

What is claimed is:

1. A floppy disk data separator comprising means for receiving an encoded data stream from an external data source, counter means coupled to said data receiving means, said counter means being reset each time a data bit is received at said data receiving means for producing a delayed clock synchronized with the input data stream, an analog phase lock loop including a variable frequency oscillator and a phase detector for comparing said delayed clock and a reference clock derived from the output of said oscillator to produce a control signal for varying the phase of the reference clock, data and clock generator means coupled to said phase lock loop for generating separated data and clock pulses in response to said reference clock, and means for operating said phase lock loop at a first, relatively high gain during the sync field portion of the input data stream and at a second relatively low gain during the data, header and address portions of the input data stream.

2. The floppy disk data separator of claim 1, further comprising means interposed between said counter and said phase detector for selecting one of the outputs of said counter as said delayed clock.

* * * * *